Patented Dec. 12, 1950

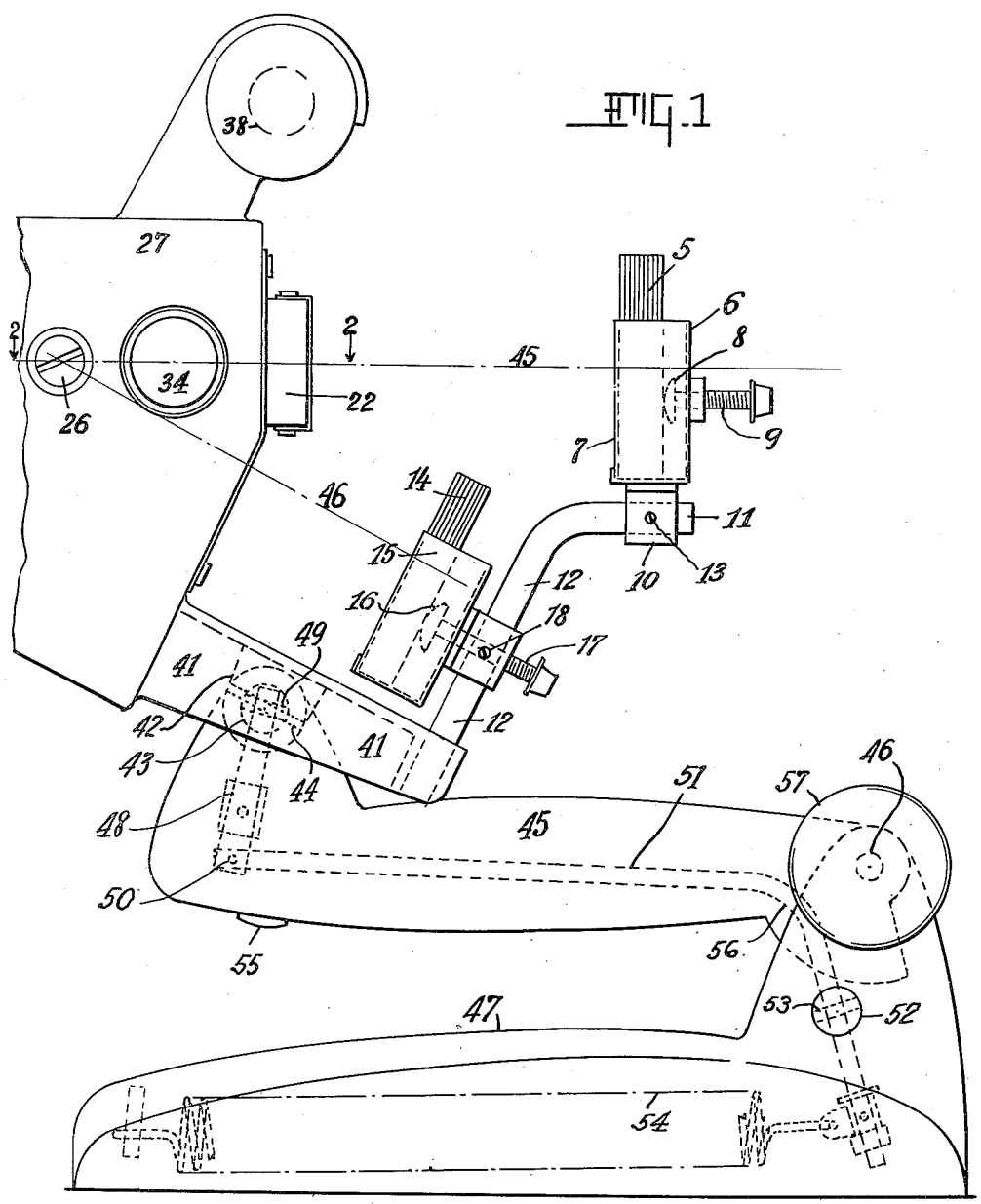

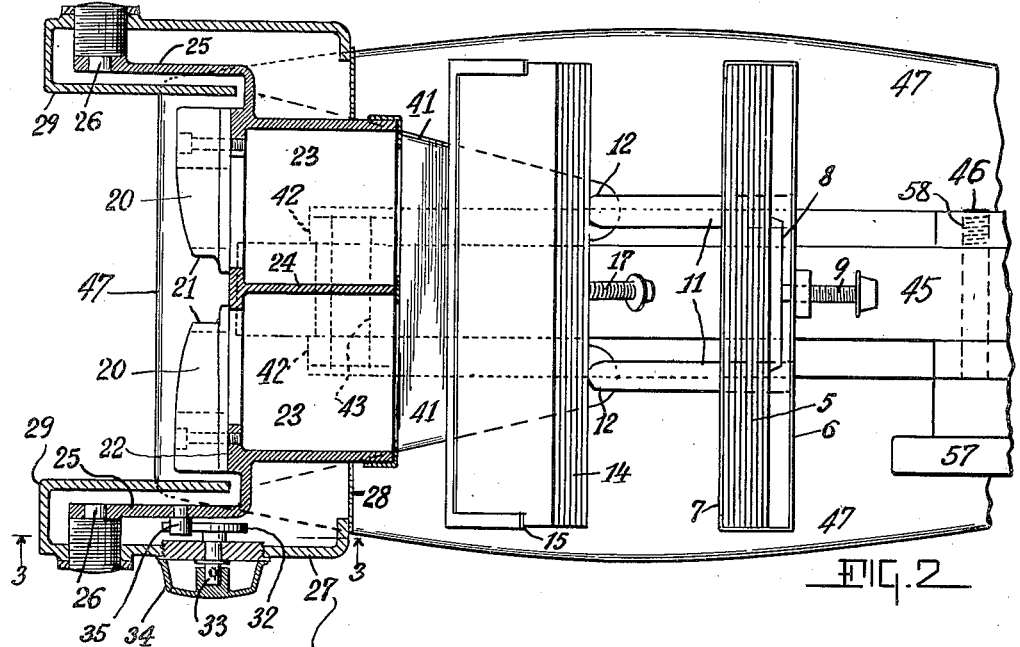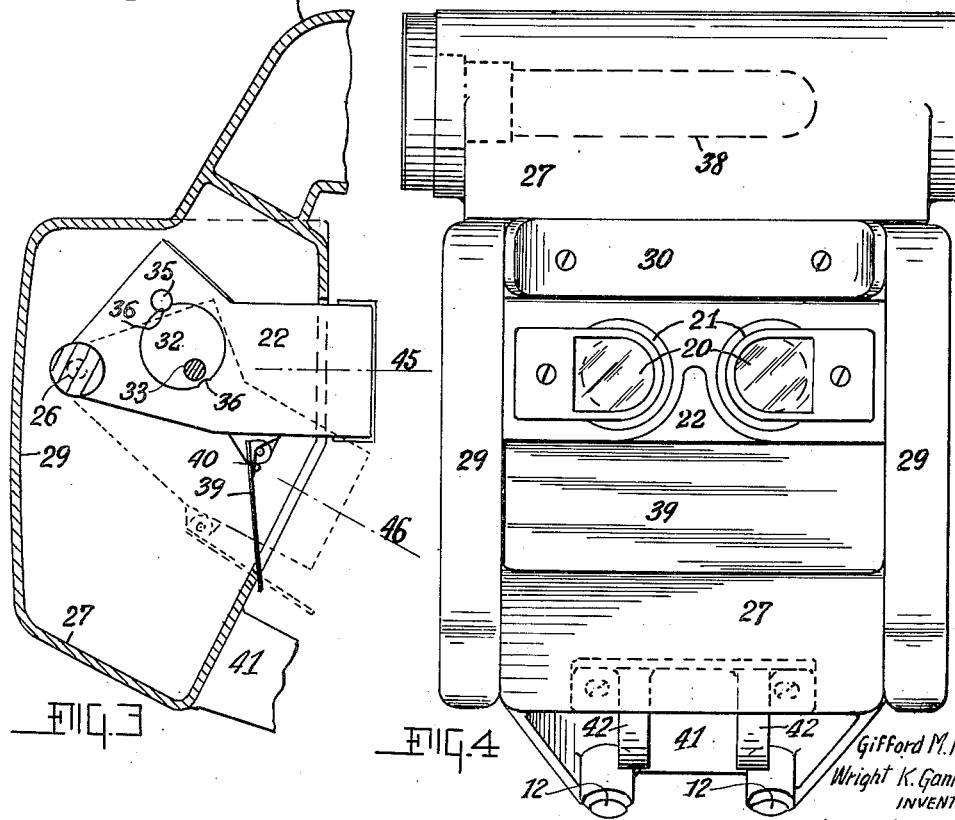

2,533,385

UNITED STATES PATENT OFFICE 2,533,385

TELEBINOCULAR INSTRUMENT FOR CONDUCTING VISION TESTS IN INDUSTRIAL OCCUPATIONS

Gifford M. Mast and Wright K. Gannett, Davenport, Iowa, assignors to Keystone View Company, Meadville, Pa., a corporation of Pennsylvania Application August 19, 1948, Serial No. 45,005

1 Claim. (Cl. 88—20)

The object of this invention is to provide an instrument for use in industry for conducting occupational visual surveys to determine the visual abilities of employees with relation to their occupational duties and work. Visual ability is an important factor in industrial production. For example it has been found that a group of employees receiving regular visual screening tests and referred for professional eye care when necessary makes greater progress in yearly earnings than is made by similar groups not given such service. Such tests also avoid much poor work and to a large extent eliminate causes of accidents.

The invention is embodied in a telebinocular instrument adapted to be operated by medical directors, nurses and members of personnel departments. The instrument comprises an optical lens system through which the subject views visual test targets or cards set at proper positions for far point and near point. The setting of the far point cards is relatively above that of the near point cards so that in viewing them the eye posture is approximately the same as in looking directly at far objects, or at near objects in reading positions, respectively. This is particularly effective for the subject wearing bifocals, so common with adults. The lens system is movable in an arc up and down so that the plane of the lenses may be set normal to the line of vision for each of the two positions of the cards. The optical lens system and the targets in suitable magazines form an upper structure which is supported upon a stand so as to be raised and lowered to suit the position of the person to be tested. The instrument includes a special counterbalancing mechanism whereby the raising and lowering of the upper structure may be accomplished without any special effort. The accompanying drawings illustrate an instrument embodying the invention.

Fig. 1 is a side view of a telebinocular for industrial visual surveys with parts broken away and showing the optical system and the reading targets in an elevated position above the stand.

Fig. 2 is a top view with parts broken away and parts in section on the line 2—2 of Fig. 1.

Fig. 3 is a sectional view on the line 3—3 of Fig. 2 with parts broken away.

Fig. 4 is a front view of the optical lens system assembly.

Occupational visual ability tests are conducted by causing the subject to view targets, usually stereographs, which are placed in either far point or near point tests positions. In far point tests vertical alinement of the eyes are checked (vertical phoria), acuity of each eye, stereopsis, horizontal alinement (lateral imbalance) and color perception, etc. The targets for these tests are marked 5 in Fig. 1 and are contained in a target magazine 6 wherein the targets are held against front flanges 7 by a follower 8 which is adjustable by a screw 9. The magazine is carried by a base 10 which is slidably supported on the horizontal arms 11 of two parallel dog leg shafts 12, 12. By operating the screw 9 the targets are held in the proper position against the front flanges, thus insuring proper reading distance. The magazine may be held in adjusted position by a set screw 13.

For near point tests, appropriate cards are set in the near point magazine which presents them in the optical system in proper relation to the depressed lenses as described above.

The near point targets 14 are contained in a magazine 15 provided with a follower 16 and an operating screw 17 to keep the front target in the proper position. The magazine 15 is adjustably and slidably supported on the dog leg shafts 12 and held in place by means of a set screw 18.

Either set of targets is viewable through an optical lens system consisting of a pair of corrected achromatic lenses 20 carried in removable lens holders 21 which in turn are secured in the lens tube casing 22 which forms two lens tubes 23 with a separating septum 24. These parts together form an optical assembly which has forwardly extending pivot lugs 25. The assembly is pivoted on pivots 26 which are screwed into the assembly housing 27. The screwthreaded pivots 26 also serve as a means for centering the tube casing in the housing. The latter has a shield through which the tubes project.

The housing 27 has forwardly extending side cheeks 29 for excluding side lights and shield the face of the person being tested and whereby the eyes are spaced from the lenses. Above the latter there is a forehead rest 30 against which the person rests the head during the tests. The optical assembly casing 22 is swingably mounted upon the pivots 26 and may be positioned in an upper or far point testing position as shown in full lines in Fig. 3, or in a lower near point testing position as shown in dotted lines in Fig. 3. The movement from the one position to the other is accomplished by means of a cam 32 which is secured upon a short shaft 33 mounted in the housing 27 and rotated by a knob 34. The optical assembly carries a pin 35 which engages the cam by gravity. The cam has two detents 36 adapted to receive the pin to position the assembly as stated.

As shown in Fig. 3 in full lines when the cam is rotated upwardly it lifts the pin 35 and thereby lifts the optical assembly into far point reading position. When the cam is rotated half a turn the optical assembly follows the movement of the cam and is lowered to near point reading position. In the upper position the assembly is alined with the far point reading targets and when it is in the lower position the assembly is alined with the near point reading targets. The assembly may be placed in either position by rotating the cam in either direction. The optical assembly cannot be wrongly positioned because it will drop by gravity except when actually raised. The contacts with the pin and cam detents give an audible and tactile signal so that the operator knows the assembly is actually in its intended position.

The head of the housing 27 supports a lamp which illuminates both sets of targets through a rearward opening in the housing. A light shield 39 is pivoted on the optical assembly to exclude light from entering from the rear of the housing which would disturb the subject during a test. The shield has a spring 40 for automatically placing the shield in light excluding position as shown.

The housing 27 has a base 41 which carries the two dog leg shafts 12. The base has two depending pivot lugs 42 for mounting the entire upper structure of the instrument upon a short shaft 43 which is rotatably carried by an arm 45. The lugs are pinned to the arm by pins 44. The arm 45 is in turn pivoted at 46 in the instrument base 47. The arm is adapted to be raised and lowered whereby to raise and lower the optical system and the target magazines to suit the position of the person taking the tests.

The optical axis of the lens system in its far point position is marked 45. The near point axis is marked 46, Figs. 1 and 3. It is important that the optical axes be maintained in their positions relative to the base irrespective of the vertical movements of the system to suit the person taking the test. For this reason a mechanism is provided which automatically maintains the relative positions of the axes and at the same time provides means for raising and lowering the upper structure with a minimum of physical effort. The upper structure is rather heavy and it is desirable that the operator should not be compelled to use any special force to accomplish the vertical movement of the parts.

The arrangement is as follows. As stated, the arm 45 is pivoted on a bolt 46 in the base 47 and in its free end the arm carries the short shaft 43 which is freely rotatable in the arm. A crank member 48 is rigidly secured in the shaft 43 by a pin 49. The lower end of the crank member is at 50 pivotally connected with a dog leg link 51 which lies inside the arm and the base of the instrument. In the latter the link 51 passes through a rotatable pivot shaft 52 and is secured thereto by a pin 53. A counterbalancing spring 54 is secured to the lower end of the link 51 and to the base 47 as shown.

The operator will usually elevate the upper structure by placing a hand underneath the housing 27 forwardly of the arm 45 so as to place the lens system in adjusted position to suit the subject. As the free end of the arm is thus raised and turns about the pivot 46, the link 51 will turn about its pivot 52 and move the crank 48 to the right in Fig. 1, thereby rotating the shaft 43 counterclockwise. The higher the housing 27 is raised, the greater will be the movement of the shaft 43, the parts being so dimensioned and designed that the housing automatically maintains its position relative to the base as shown in Fig. 1, without angular change with respect to the base and irrespective of the length of the raising movement. Inasmuch as the targets are supported on the housing 27, they will also at all times maintain their respective positions. That is, the optical axes of the lens system for both reading positions remain as predetermined irrespective of the vertical movements of the system with respect to the position of the person taking the test and with respect to the base. The spring 54 counterbalances the entire upper structure which may be raised by a mere slight touch of the hand of the operator, who therefore can devote his entire attention to the conducting of the tests.

The far point magazine may be adjusted horizontally along the arms 11 of the shafts 12. The near point magazine may be adjusted to the proper height by sliding it along the shafts 12. Also by adjusting the vertical position of the shafts 12 the height of the upper magazine may be adjusted. When entirely collapsed the arm 47 will come to rest upon the base on a rubber button 55. When the assembly is raised the curved part of the dog leg link 51 will eventually strike against the pivot 56 and thus prevents further raising. A hand knob 57 is provided for locking the arm 45 to the base 47 in any position by screwing the bolt 46 tight to clamp the arm to the base, the bolt being threaded into the base on one side as indicated at 58, Fig. 2.

The tests are conducted by the subject reporting what he observes from the targets in either far point or near point reading. His observations are noted and in turn serve as a guide for further treatment, if any. During the test the operator may switch the optical system from far point to near point reading and vice versa by turning the cam. As the targets are changed for different tests they will be moved forward in the magazines and adjusted.

We claim:

An instrument of the character described comprising a housing including a base; a movable optical lens system in said housing; a first magazine containing a near point vision target; a second magazine containing a far point vision target; shafts in said base; means for adjustably supporting the said two magazines upon the said shafts in visible accessible spaced relation to said housing and in spaced near point and far point relations to the said lens system, respectively; means in the housing for moving said lens system into either a near point or a far point target viewing position comprising a lens casing including lenses; means for adjustably pivoting said lens casing in the said housing; a cam rotatably mounted in the housing; a pin on said lens casing resting by gravity upon the cam; a hand knob for rotating the cam to lift the lens system into a far point target viewing position or permit the lens system to drop by gravity into a near point target viewing position; an overhead lamp for illuminating said targets and a light shield pivoted on the said lens casing below the same and adapted to swing automatically away from said casing to exclude extraneous light from illuminating the said near point vision target when the said lens casing is moved into position for viewing the said far point target.

GIFFORD M. MAST.
WRIGHT K. GANNETT.

REFERENCES CITED

The following references are of record in the file of this patent:

UNITED STATES PATENTS

| Number | Name | Date |
|---|---|---|
| 2,147,957 | Ames | Feb. 21, 1939 |
| 2,330,709 | Harper et al. | Sept. 28, 1943 |
| 2,364,793 | Jobe et al. | Dec. 12, 1944 |
| 2,389,155 | Kerry | Nov. 20, 1945 |
| 2,394,521 | Lynn | Feb. 5, 1946 |
| 2,481,582 | Ellis | Sept. 13, 1949 |